June 13, 1967  G. E. STONG  3,325,266
METHOD OF PRODUCING COMPOSITE SEMICRYSTALLINE ARTICLES
Filed April 14, 1966
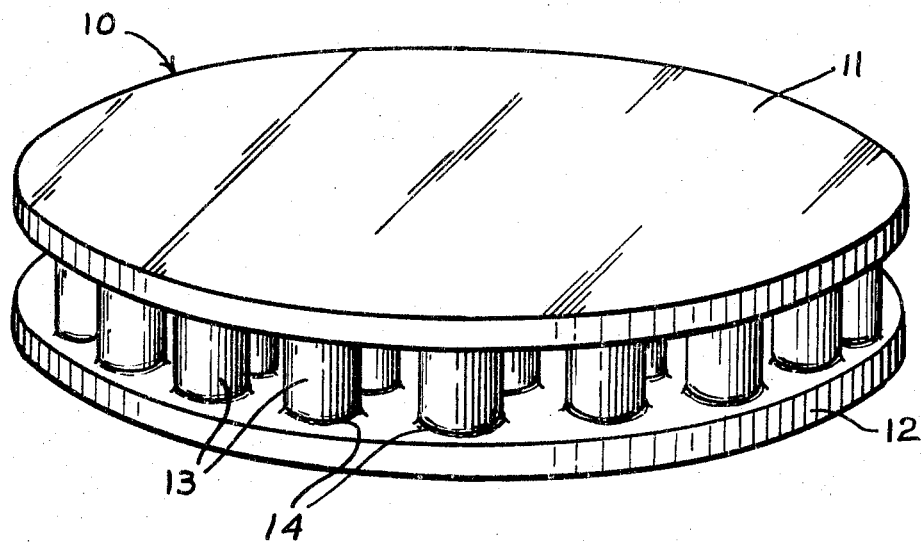
INVENTOR.
GUY E. STONG
BY
Clarence R. Patty, Jr.
ATTORNEY 3,325,266
METHOD OF PRODUCING COMPOSITE SEMICRYSTALLINE ARTICLES
Guy E. Stong, Elmira, N.Y., assignor to Corning Glass Works, Corning, N.Y., a corporation of New York
Filed Apr. 14, 1966, Ser. No. 549,100
3 Claims. (Cl. 65—33)

This application is a continuation-in-part of my pending application, Ser. No. 324,165, filed Nov. 12, 1963, now abandoned which application was in turn a continuation-in-part of Ser. No. 19,650, filed Apr. 4, 1960, and now abandoned.

This invention relates to a method of making composite crystalline bodies by joining together individual elements thereof into a single unitary structure. Semicrystalline bodies are made by the controlled crystallization by heat treatment of a glass body according to the method disclosed in Patent No. 2,920,971, and have the same physical structure as the articles described in that patent. Wherever the term "semicrystalline materials" (body, element, etc.) is used throughout the present specification and claims it shall be understood to mean a material so produced. As is pointed out in such patent, one of the primary advantages of such a method is that articles can be produced from the molten glass body by conventional glassforming techniques such as pressing, blowing, drawing and the like and thereafter can be transformed into a semicrystalline body, having the desirable properties thereof, by heat treating the preformed article without substantially changing its size and shape. Although such articles have some characteristics, such as zero porosity and high strength, which make them more desirable than conventional ceramic bodies produced by sintering ceramic batches, fabrication of complex bodies therefrom have presented many problems.

First of all, the shapes which can be formed from the molten glass are somewhat limited. Secondly, preformed elements of such glasses can be joined only with difficulty by conventional glass techniques such as lamp-working because reheating of portions of the glass tends to produce crystallization, thereby introducing areas of weakness in the body during such operation or upon the subsequent heat treatment to produce controlled crystallization throughout the entire structure. While elements which have been heat treated to cause the controlled crystallization thereof can be joined together into complex structures by known ceramic methods such as metallization and soldering or with metallic coupling devices, these methods are not altogether suitable, especially for applications wherein the product is subjected to elevated temperatures or to sudden and/or repeated changes in temperature.

The primary object of this invention is to provide a method for making composite, unitary semicrystalline ceramic bodies.

Another object is to provide a method for producing a composite semicrystalline body which can withstand thermal cycling.

A still further object is to provide a method for producing a composite semicrystalline body which can withstand elevated temperatures.

The accompanying drawing illustrates a novel optical mirror produced by the method of this invention.

The method of this invention broadly comprises the application to selected areas of at least one preformed element of the desired structure a cementing composition consisting essentially of at least one fluoride salt selected from the group consisting of LiF, NaF, KF, $MgF_2$, $CaF_2$, $SrF_2$, $BaF_2$, $PbF_2$, and $ZnF_2$, placing the thus coated surface in contacting relationship with another preformed element, and thereafter heating the bodies to a temperature of at least 800° C.

While it is not possible to find the reasons why this process produces such satisfactory bonds between the semicrystalline ceramic elements, it is believed that when the cementing composition is heated, it produces fluid products either by melting or reaction with the semicrystalline material, which readily wet the surface of the bodies to be joined and also permeate each of such surfaces to form a bridging structure extending beneath the surfaces of each of the bodies and that the microscopic crystals present in the semicrystalline bodies cause any reaction product formed by the action of the cementing composition on the semicrystalline body to crystallize to a desirably fine-grained structure. Because such reaction apparently does occur and is necessary in order to provide a satisfactory bond, attempts to join stable glasses by such a method result in coarse-grained devitrification and checks occurring in the glass, whereas attempts to join conventional sintered-ceramic bodies in a similar fashion results in fused zones at the interface which readily crack upon cooling.

More specifically, the objects of my invention are achieved by first producing elements of the desired structure in a conventional manner from the molten glass as described in the above-mentioned patent. The element may then be further conformed to the desired configuration by such mechanical finishing means as grinding and cutting, or the elements may be converted to the semicrystalline condition by heat treatment thereof according to the aforementioned patent prior to such finishing operations inasmuch as my method can be utilized to join elements which have been converted to the semicrystalline condition, or to join elements simultaneously with the heat treatment which produces the semicrystalline body from the glass.

A cementing composition consisting essentially of at least one of the above enumerated fluoride salts is thereupon applied to the selected areas of the thus formed elements. The cementing composition can be applied in any convenient manner such as by dissolving the salts in the solvent and thereafter spraying or brushing the solution on the desired areas or by dipping the desired areas into the solution. Furthermore, it is also possible to prepare a suspension or paste of the cementing composition which can be brushed or spread on the desired surfaces. The solvent or the carrier liquid can thereafter readily be removed by evaporation from the surfaces to leave the cementing composition thereon. A particularly suitable method for applying the cementing composition comprises suspending the cementing composition in an organic film forming solution such as cellulose acetate and the like and thereafter evaporating the solvents from such organic material to produce a film of uniform thickness containing the cementing composition suspended evenly throughout. Thereafter it is possible to cut from such film portions having the desired shape and placing them upon the surfaces to be joined. The subsequent heating step thereafter eliminates the organic material from the film and deposits the cementing composition upon the desired area of the bodies.

The elements are joined by placing the elements in contacting relationship with the film or layer of cementing composition sandwiched therebetween, and placing them in a furnace, the elements being maintained in their correct relationship by suitable supporting means such as a jig or clamps. The furnace is them heated to a temperature of at least 800° C. and preferably in excess of the melting point of the cementing composition but below the point at which the cementing composition boils or decomposes and also below the deformation temperature f the elements, i.e. the temperature at which the elements eform and thereby lose their desired shape. While the me necessary for a good joint to be achieved by this method varies with the temperature, the minimum temperatures requiring the longest time, I have found that the preferred method comprises maintaining a temperature of about 1100° C. to 1400° C. for a time of about to 8 hours. However, some of the advantages of this method can be achieved with a time as short as ½ hour ven at a temperature of about 800° C. Of course, when practicing the particular embodiment of this invention which comprises joining elements simultaneously with the heat treatment utilized to controllably crystallize the lass to the desired semicrystalline condition, the heat treatment utilized must be that which is dictated in order to produce the desired crystallization.

Table I sets forth the compositions of seven glasses which are representative of the wide variety of materials which can be utilized in the above-described process. Other glass compositions operable in my invention are recorded in Patent No. 2,920,971 which has been referred to above and these are incorporated by reference herein.

TABLE I

|        | A  | B   | C   | D  | E  | F    | G    |
|--------|----|-----|-----|----|----|------|------|
| O2     | 56 | 71  | 25  | 56 | 40 | 40   |      |
| l2O3   | 20 | 18  | 45  | 40 | 40 |      |      |
| iO2    | 9  | 4.5 |     |    |    |      |      |
| gO     | 15 | 3   |     |    |    |      |      |
| nO     |    | 1   |     |    |    |      |      |
| i2O    |    | 2.5 |     |    |    |      |      |
| 2O5    |    |     | 13  |    |    |      | 83.2 |
| rO2    |    |     | 15  |    |    |      |      |
| a2O    |    |     | 2   |    |    |      |      |
| ;O     |    |     |     | 4  |    |      |      |
| aO     |    |     |     |    | 20 | 57.5 |      |
| ·O     |    |     |     |    |    | 2.5  |      |
| aO     |    |     |     |    |    |      | 7.5  |
| 2O3    |    |     |     |    |    |      | 9.3  |

To demonstrate the effectiveness of my present process, I prepared sample bars of each of the above compositions, some of which had been crystallized to the semicrystalline condition by heat treatment thereof, of a size of about ½ inch square by 1 inch long. The samples were ground in a conventional grinder to produce flat surfaces thereon. Suitable cementing compositions were then prepared in a paste form by mixing with a small amount of butyl alcohol and the cementing composition was spread on the middle of a ½" x 1" surface of one test bar for a distance of ½". A second similar test bar was then placed on the cementing composition at right angles to the axial length of the first test bar, thus giving an area of contact between the two bars of ¼ inch square. The butyl alcohol was then allowed to evaporate from the film and the test bars fired to produce the desired bond. After firing, the strength of the bond was determined by measuring the force, applied in the direction perpendicular to the area of contact between the two bars, necessary to break the bond.

The examples hereinafter set forth show the strength obtainable for a wide variety of cementing compositions utilizing my novel method for producing composite semicrystalline articles having the illustrative compositions set forth in Table I.

*Examples 1–8*

Cross bars of semicrystalline material of composition A were assembled as described above utilizing the cementing compositions set forth in Table II, fired by heating to 1260° C. at 5° C. per minute, held at 1260° C. for hours, and cooled to room temperature at 3° C. per minute. The composite semicrystalline bodies thus formed were tested as described above and the modulus of rupture, set forth in Table II, determined.

TABLE II

| Example No. | Cementing Composition | M.O.R. (p.s.i.) |
|---|---|---|
| 1 | NaF | 1,600 |
| 2 | KF | 1,900 |
| 3 | MgF2 | 1,500 |
| 4 | CaF2 | 1,300 |
| 5 | SrF2 | 1,550 |
| 6 | BaF2 | 1,450 |
| 7 | ZnF2 | 1,800 |
| 8 | PbF2 | 1,300 |

*Examples 9–23*

Cross bars of glass having the composition denoted B in Table I were assembled as described above utilizing the cementing compositions set forth in Tables III and IV. One series of samples was simultaneously joined and converted to semicrystalline ceramic bodies by heating at 5° C. per minute to 800° C., held at 800° C. for 1 hour, heated to 1150° C. at 5° C. per minute, held at 1150° C. for 4 hours and thereafter cooled to room temperature at 4° C. per minute. The composite semicrystalline bodies thus formed were tested as described above and the modulus of rupture, set forth in Table III, determined.

TABLE III

| Example No. | Cementing Composition | M.O.R. (p.s.i.) |
|---|---|---|
| 9 | LiF | 3,200 |
| 10 | NaF | 2,200 |
| 11 | KF | 1,400 |
| 12 | CaF2 | 1,100 |
| 13 | SrF2 | 1,400 |
| 14 | PbF2 | 1,600 |

Another series of such samples was simultaneously joined and converted to semicrystalline ceramic bodies by heating at 5° C. per minute to 800° C., held at 800° C. for 1 hour, heated to 1000° C. at 1° C. per minute, held at 1000° C. for 2 hours, heated to 1190° C. at 1° C. per minute, held at 1190° C. for 4 hours, and cooled to room temperature at 40° C. per hour. The composite semicrystalline bodies thus formed were tested as described above and the modulus of rupture, set forth in Table IV, determined.

TABLE IV

| Example No. | Cementing Composition | M.O.R. (p.s.i.) |
|---|---|---|
| 15 | LiF | 2,800 |
| 16 | MgF2 | 1,700 |
| 17 | CaF2 | 2,000 |
| 18 | BaF2 | 1,300 |
| 19 | 84 wt. percent NaF / 16 wt. percent KF | 3,200 |
| 20 | 90 wt. percent LiF / 10 wt. percent NaF | 4,800 |
| 21 | 80 wt. percent LiF / 20 wt. percent NaF | 3,200 |
| 22 | 70 wt. percent LiF / 30 wt. percent NaF | 3,200 |
| 23 | 60 wt. percent LiF / 40 wt. percent NaF | 3,200 |

*Examples 25–31*

Cross bars of semicrystalline material having the composition C in Table I were assembled as described above utilizing the cementing compositions recorded in Table V. The cross bars of the examples were joined by heating at 5° C./minute to 1400° C., maintaining the temperature thereat for 8 hours, and then cooling to room temperature at 5° C./minute. The composite semicrystalline bodies thus formed were tested in the manner described above and the modulus of rupture determined thereby is also recorded in Table V.

TABLE V

| Example No. | Cementing Composition | M.O.R. (p.s.i.) |
| --- | --- | --- |
| 24 | NaF | 2,700 |
| 25 | KF | 3,300 |
| 26 | BaF | 2,600 |
| 27 | PbF$_2$ | 2,500 |
| 28 | MgF$_2$ | 3,800 |
| 29 | 66 wt. percent BaF$_2$ / 34 wt. percent PbF$_2$ | 2,700 |
| 30 | 75 wt. percent MgF$_2$ / 25 wt. percent PbF$_2$ | 3,200 |
| 31 | 66 wt. percent MgF$_2$ / 34 wt. percent PbF$_2$ | 2,400 |

Examples 32–34

Cross bars of semicrystalline material having the composition D were assembled as described above wherein the cementing compositions set forth in Table VI were employed. The heating schedule utilized in the cementing operation was the same as that described above with respect to the examples of composition C. The modulus of rupture measurements conducted on these examples are recorded in Table VI.

TABLE VI

| Example No. | Cementing Composition | M.O.R. (p.s.i.) |
| --- | --- | --- |
| 32 | NaF | 1,300 |
| 33 | PbF$_2$ | 1,200 |
| 34 | 66 wt. percent BaF$_2$ / 34 wt. percent MgF$_2$ | 1,100 |

Examples 35–39

Cross bars of semicrystalline material having the composition E were then assembled in accordance with the above-described method utilizing the cementing compositions recorded in Table VII. The heating schedule followed to yield a strong seal was identical with that set forth above with respect to the examples of compositions C and D. Table VII also includes the results of modulus of rupture measurements made on the examples.

TABLE VII

| Example No. | Cementing Composition | M.O.R. (p.s.i.) |
| --- | --- | --- |
| 35 | NaF | 1,100 |
| 36 | MgF$_2$ | 1,200 |
| 37 | 50 wt. percent MgF$_2$ / 50 wt. percent BaF$_2$ | 2,800 |
| 38 | 50 wt. percent NaF$_2$ / 50 wt. percent BaF$_2$ | 1,000 |
| 39 | LiF | 1,000 |

Example 40

Semicrystalline cross bars of composition A were coated with a cementing composition consisting of 84 wt. percent of NaF and 16 wt. percent of KF in a butyl alcohol suspension. The bars were dried to remove the butyl alcohol and then joined by heating to 600° C. at 5° C. per minute, held for 1 hour, heated to 1260° C. in about 2 hours, held for 40 minutes and allowed to cool to room temperature in about 8 hours. The M.O.R. of the joint so produced was 1700 p.s.i.

Examples 41–43

Cross bars of semicrystalline material having the composition F were assembled as described above employing the cementing compositions recorded in Table VIII, fired by heating to 1200° C. at 100° C. per hour, held at 1200° C. for 8 hours, and then cooled to room temperature at 5° C. per minute. The composite semicrystalline articles thus fabricated were tested as described above and the modulus of rupture values set out in Table VIII obtained.

TABLE VIII

| Example No. | Cementing Composition | M.O.R. (p.s.i.) |
| --- | --- | --- |
| 41 | 78.7% ZnF$_2$+21.3% NaF (by wt.) | 2,1 |
| 42 | 78.7% ZnF$_2$+21.3% NaF (by wt.) | 2,1 |
| 43 | 65% CaF$_2$+35% NaF (by wt.) | 1,9 |

Examples 44–45

Cross bars of semicrystalline material of compositio G were joined together in the manner described abov utilizing the cementing compositions set out in Table IX fired by heating to 815° C. at the rate of 5° C. per min ute, maintained thereat for 8 hours, and thereafter coole to room temperature at 3° C. per minute. The sem crystalline bodies thus joined together into a unitary struc ture were tested for mechanical strength and the modulu of rupture determined as described above.

TABLE IX

| Example No. | Cementing Composition | M.O.R. (p.s.i.) |
| --- | --- | --- |
| 44 | 66.3% MgF$_2$+33.7% LiF (by wt.) | 1,0 |
| 45 | 78.7% ZnF$_2$+21.3% NaF (by wt.) | 1,1 |

A particularly suitable method for applying the ce menting composition to the elements to be joined com prises utilizing an organic film containing the cementin composition suspended therein. A preferred method o producing such a film comprises mixing the fluoride ce menting composition with about twice its weight of methyl methacrylate resin solution to obtain a uniforr mixture. A polymerization catalyst, benzoyl peroxide, i added to the mixture in an amount equal to about 1% of the weight of the resin. The mixture is poured out o a suitable surface, such as a glass plate coated with film of silicone parting material, and spread to a uniforn film thickness. The film is allowed to cure and in so doin it shrinks to about half its original thickness. Thus a film originally formed to a thickness of .007" cures to a thick ness of .004" and contains .08 gram of cementing com position per square inch of film. The film may be easil cut with a knife or scissors to any desired shape an applied to the surface or surfaces to be joined.

The method has been found to be particularly suitabl for the manufacture of optical mirrors which will be mor fully described with reference to the drawing. The draw ing shows an isometric view of an optical mirror 10 com prising two flat, parallel discs 11 and 12 spaced apar from each other but joined into a unitary structure by multitude of cylindrical elements, such as 13; the bondin of such elements being achieved by joint 14. As can b seen from the drawing, the cylindrical elements are ar ranged in symmetrical arrangement about the center o discs 11 and 12. The number of such elements will b determined by the size of the mirror and the size of th cylindrical elements; 37 tubes with an outside diamete of about 1' being suitably arranged in three concentri circles about a tube at the center of the discs for a mirro about 10" in diameter.

For such a mirror, glass elements having compositio B are prepared to the desired size. The discs 11 and 1 are ground to 10" in diameter by ¼" thick and the tube with an O.D. of about 1" and an I.D. of about ⅞" ar ground to a length of 1". The ends of each tube are the coated with the cementing composition utilized in Ex ample 19 and the elements are assembled in the desire relationship. The assembled article is then heated ac cording to the schedule utilized for Example 19 to con vert the glass to a semicrystalline body and join it into single unitary structure. The outer surface of the disc 1 is then ground to the desired optical surface.

A mirror formed by the above-described process was then tested by immersing one-half of it in a liquid maintained at −78° C. while the other one-half was maintained at about 20° C. No damage to the body or joints is observed.

Furthermore, the mirror was subjected to shocks of 5 G's a total of 5 times along each of three mutually perpendicular axes without damage to the joints.

Since this invention has been demonstrated with the examples set out in Table I, the compositions of which are widely varying, and the examples recorded in Patent No. 920,971 have been incorporated into this disclosure by reference thereto, it is believed that this invention can be understood to have general applicability to all semicrystalline materials.

I claim:
1. A method for producing a composite semicrystalline body made up of individual preformed elements, a semicrystalline body being made by the controlled crystallization by heat treatment of a glass body, which comprises applying to selected areas of at least one preformed element a coating of a cementing composition consisting essentially of at least one fluoride salt selected from the group consisting of LiF, NaF, KF, $MgF_2$, $CaF_2$, $SrF_2$, $BaF_2$, $PbF_2$, and $ZnF_2$, placing the thus coated surface in contacting relationship with another preformed element, and thereafter heating the contacting elements to a temperature of at least 800° C. but below the deformation temperature of said elements to join together said elements.

2. The method according to claim 1 wherein the preformed elements are of semicrystalline material.

3. The method according to claim 1 wherein the preformed elements are of glass such that said elements will be simultaneously crystallized and joined together during the heating thereof to at least about 800° C. but below the deformation temperature of said elements.

References Cited
UNITED STATES PATENTS

| | | | |
|---|---|---|---|
| 2,399,770 | 5/1946 | Taylor | 65—43 |
| 2,687,364 | 8/1954 | Buerger et al. | 156—245 |
| 2,767,336 | 10/1956 | Arenberg | 310—8.3 |
| 2,889,952 | 6/1959 | Claypoole | 65—33 |
| 2,920,971 | 1/1960 | Stookey | 65—33 |
| 3,137,602 | 6/1964 | Lincoln | 65—36 X |
| 3,189,512 | 6/1965 | Stong | 161—192 |

DONALL H. SYLVESTER, *Primary Examiner.*

F. W. MIGA, *Assistant Examiner.*